UNITED STATES PATENT OFFICE.

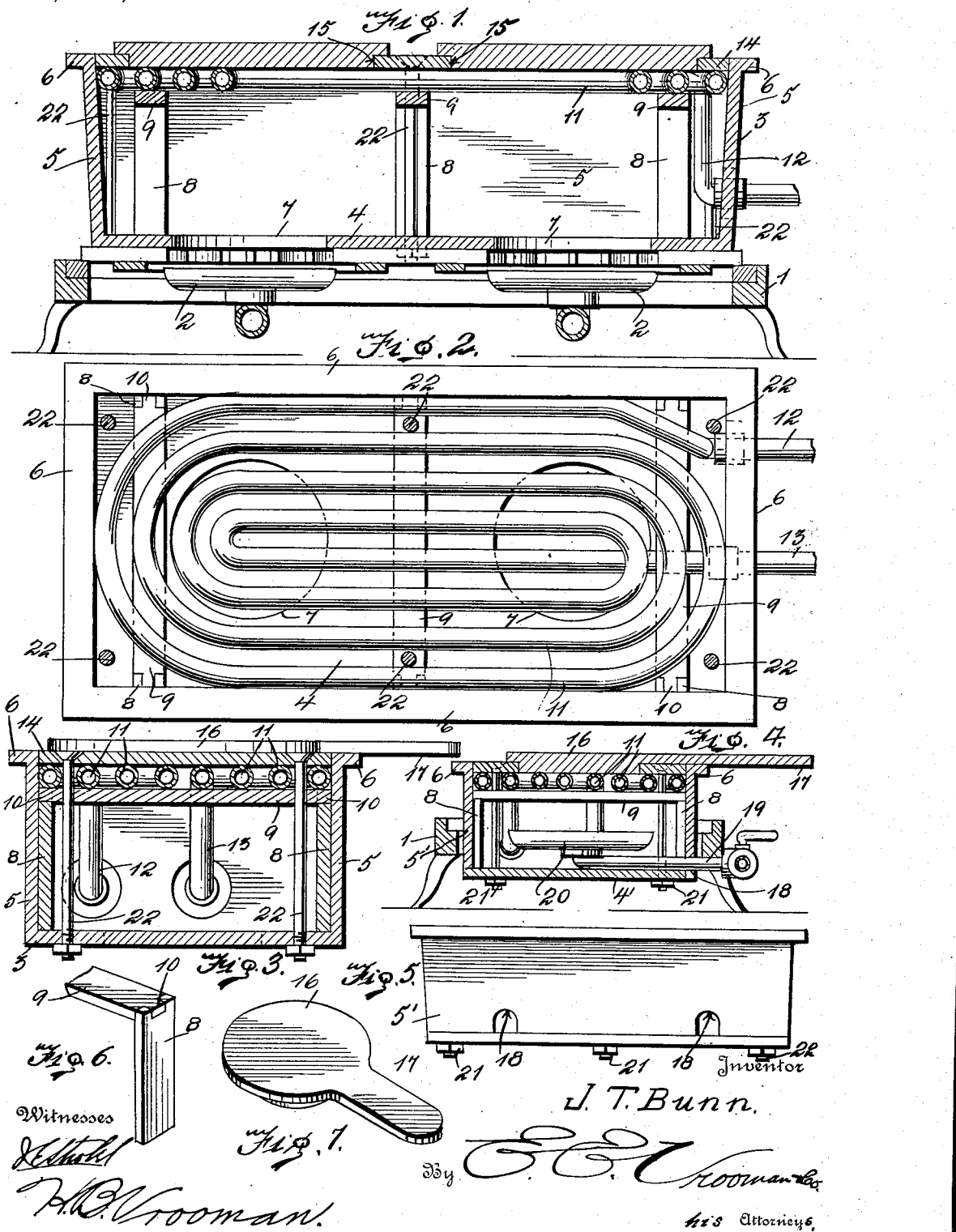

JOSEPH T. BUNN, OF WASHINGTON, DISTRICT OF COLUMBIA.

HEATING DEVICE FOR GAS STOVES AND RANGES.

1,171,700. Specification of Letters Patent. Patented Feb. 15, 1916.

Application filed October 13, 1914. Serial No. 866,522.

*To all whom it may concern:*

Be it known that I, JOSEPH T. BUNN, a citizen of the United States, residing at Washington, District of Columbia, have invented certain new and useful Improvements in Heating Devices for Gas Stoves and Ranges, of which the following is a specification, reference being had therein to the accompanying drawing.

This invention relates to a heating device for gas stoves and has for its principal object the production of a casing which may be placed upon a gas stove in a simple manner so as to allow the heat from the flames to efficiently heat a plurality of coils whereby water may be heated, at which time the heat may be expelled from the casing for heating any vessel which may be carried by the outer portions of the casing.

Another object of this invention is the production of a heating casing which may be carried upon a gas stove and which is so formed as to efficiently support a plurality of coils whereby the heat from the flames may heat the coils the upper portion of the casing being adapted to rest upon the coils for efficiently retaining the same in their correct position, this upper portion being so formed as to allow heat to be expelled from the casing to allow the same to heat a vessel carried upon the outer portion thereof.

A still further object of this invention is the production of a heating device for gas stoves wherein the casing may be positioned so as to allow the burners of the stove to be positioned within the interior thereof in such manner as to cause the flames to heat the coils carried by the casing and allow the heat to be expelled from the casing as desired.

With these and other objects in view, this invention consists of certain novel constructions, combinations and arrangements of parts as will be hereinafter fully described and claimed.

In the drawing:—Figure 1 is a central longitudinal section through the heating device, showing the same carried by a gas stove. Fig. 2 is a top plan view of the heating device, the cover or top thereof being removed. Fig. 3 is a central transverse section through the heating device. Fig. 4 is a central transverse section through a slightly modified form of the heating device, wherein the burners of the gas stove are carried within the casing. Fig. 5 is a side elevation of the modified form of the casing as shown in Fig. 4. Fig. 6 is a fragmentary perspective view of one of the bars and supporting standards therefor. Fig. 7 is a detail perspective view of one of the covers for the top.

Referring to the accompanying drawing by numerals, 1 designates in general a gas stove upon which this heating device is adapted to be positioned. This gas stove 1 is provided with the usual burners 2 for supplying heat to the casing for heating the coils thereof and also for heating a suitable vessel which may be carried thereby.

The casing 3 comprises a box-like structure having a supporting base 4 and side walls 5 terminating in lateral flanges 6 at their upper portions. This base wall is provided with enlarged openings 7 which are so formed as to register with the burners 2 for allowing the heat to pass upwardly into the interior of the heating device or casing.

A plurality of burner standards 8 are carried at spaced intervals within the side portions of the casing 3 and upon these standards 8 there is carried a plurality of supporting bars 9, as clearly shown in Fig. 1. These bars or standards are held in engagement with each other by means of the dove-tail construction shown at 10 in Fig. 6, whereby one of the bars and two of the standards will form a substantial rigid structure. The coils 11 are positioned within the casing so as to rest upon the bars 9, as clearly shown in Figs. 1 and 2, whereby the coils will be held at a spaced distance above the burners 2 of the stove 1. These coils are provided with an intake pipe 12 and an exhaust pipe 13 communicating with the outer portions of the casing, whereby water may be passed through the coils and efficiently heated, and then exhausted therefrom. The top 14 is positioned upon the coils 11, as clearly shown in Figs. 1 and 3, and in this manner the coils will be held firmly in engagement with the bars 9 and will be prevented from losing their correct shape. This top 14 is also provided with openings 15 formed in registry with the openings 7 formed in the base 4. Therefore, when the heat passes upwardly through the casing 3 it will be expelled through the openings 15. It will be seen that a vessel may be positioned upon the top 14 so as to cover or partially cover one of the openings 15 and the heat from the casing will pass around the vessel so as to heat the same for cooking any suitable substance carried therein. There are also provided the caps 16 having handles 17 extending therefrom and these caps are adapted to close either one or both of the openings 15 when it is so desired. It will be seen that the top 14 is held firmly upon the upper portions of the coils 11 whereby the coils will be held in their correct positions upon the bars 9. This top is retained by means of the rods 22 which pass through the top and bottom as clearly shown in Fig. 3.

By referring to Figs. 4 and 5 it will be seen that the side walls 5' of the casing may be provided with holes 18 for the reception of the gas pipes 19 which carry the burners 20. In forming the device in this manner the base 4' is detachable so as to allow the walls 5' to be passed down over the burners and allow the pipes 19 to pass through the slots 18. The base may then be placed in position and the retaining bolts 21 passed upwardly so as to engage the top 14 of the casing for holding the top and bottom in engagement with the side walls 5'. This form of a casing is provided with the usual standards and bars for supporting the coils whereby the water may be efficiently heated, at which time the heat will pass upwardly through the openings formed in the top portion of the casing for heating a suitable vessel carried thereby.

What I claim is:

1. In a heating casing the combination of an inclosed rectangular body, said body comprising a base having side walls, said base provided with burner openings in its lower portion, a plurality of standards carried by said body and fitting snugly against said side walls, horizontal supporting bars carried by said standards, coils carried upon said supporting bars, said casing being adapted to receive heat from a stove through said burner openings whereby said coils will be heated, said casing provided with a top having openings formed therein above the openings formed in said base whereby the heat within said casing can only be expelled through the last-mentioned openings thereby necessitating the passing of the heat around the coils.

2. In a heating device of the class described the combination of an inclosed casing, said casing provided with burner openings in its lower portion, said casing being adapted to be carried by a gas stove whereby the heat from the burners of the gas stove will pass upwardly into said casing through said burner openings, vertical standards carried by the inner portions of said casing, and fitting against the side portions thereof, horizontal supporting bars carried by the upper ends of said standards, a plurality of coils loosely mounted upon said bars and provided with an inlet pipe and an exhaust pipe, said coils being capable of being removed when desired, a top carried by said casing, said top bearing upon said coils whereby the coils will be held against accidental displacement, means for detachably retaining said top in position, said top provided with a plurality of openings whereby the heat within said casings will be exhausted through said last-mentioned openings, whereby the heat will circulate about said coils before being exhausted.

3. In a heating device of the class described the combination of an inclosed casing, said casing provided with burner openings in its lower portion, said casing being adapted to be carried by a gas stove whereby heat from the burner of the gas stove will pass upwardly into said casing through said burner openings, a plurality of coils carried within said casing, means for releasably supporting said coils adjacent the top portion of said casing, a top carried by the upper portions of said casing and bearing upon said coils for holding said coils against accidental displacement, detachable rods passing through said top and through the lower portions of said casing whereby said top will be positively retained in position, said top provided with openings whereby the heat in said casing will circulate around the said coils so as to escape through said last-mentioned openings.

4. In a heating device of the class described, the combination of a casing comprising a base having side walls, a plurality of standards carried by said base and fitting snugly against said side walls, horizontal supporting bars carried by said standards, coils carried upon said supporting bars, said casing being adapted to be carried by a gas stove, means formed upon the lower portions of said casing for allowing heat from the gas stove to be injected into the lower portions of said casing, a top carried by said casing above said coils, said top having openings, whereby the heat within said casing can be expelled only through said openings, thereby necessitating the passage of the heat around said coils.

In testimony whereof I hereunto affix my signature in presence of two witnesses.

JOSEPH T. BUNN.

Witnesses:
H. B. VROOMAN,
M. G. McDEVETT.

Copies of this patent may be obtained for five cents each, by addressing the "Commissioner of Patents Washington, D. C."